United States Patent [19]

Wight

[11] E Re. 29,477

[45] Reissued Nov. 22, 1977

[54] FOOD PRODUCT FREEZING APPARATUS

[75] Inventor: Edward M. Wight, Austin, Tex.

[73] Assignee: Glacier Industries, Inc., Austin, Tex.

[21] Appl. No.: 759,051

[22] Filed: Jan. 13, 1977

Related U.S. Patent Documents

Reissue of:

[64] Patent No.: 3,857,252
Issued: Dec. 31, 1974
Appl. No.: 324,432
Filed: Jan. 17, 1973

[51] Int. Cl.[2] ..... F25D 23/02

[52] U.S. Cl. ..... 62/266; 62/380; 62/441

[58] Field of Search ..... 62/63, 64, 65, 266, 62/345, 378, 380, 381, 441; 138/39

[56] References Cited

U.S. PATENT DOCUMENTS

| | | | |
|---|---|---|---|
| 2,237,256 | 4/1941 | Finnigan | 62/63 |
| 2,273,818 | 2/1942 | Childers et al. | 138/39 |
| 2,385,140 | 9/1945 | Knowles | 62/65 |
| 2,489,918 | 11/1947 | Melees | 62/65 |
| 2,887,855 | 5/1957 | Glass | 62/380 |
| 2,925,052 | 2/1960 | Glass | 62/345 |
| 3,201,951 | 8/1965 | Robinson | 62/380 |
| 3,296,812 | 1/1967 | Cloudy | 62/63 |
| 3,412,476 | 11/1968 | Astrom | 62/381 |
| 3,733,848 | 5/1973 | Duron et al. | 62/381 |
| 3,769,807 | 11/1973 | Foster | 62/63 |

FOREIGN PATENT DOCUMENTS

| | | | |
|---|---|---|---|
| 10,630 | 6/1967 | Japan | 62/266 |
| 15,091 | 6/1961 | Japan | 62/381 |
| 22,068 | 7/1970 | Japan | 62/380 |
| 731,749 | 6/1955 | United Kingdom | 62/80 |
| 740,831 | 11/1955 | United Kingdom | 62/266 |
| 765,760 | 1/1957 | United Kingdom | 62/381 |

*Primary Examiner*—Ronald C. Capossela
*Attorney, Agent, or Firm*—Kenway & Jenney

[57] ABSTRACT

A continuous conveyor transport food products in, through and out of a rectangular freezing vault containing a blower and a refrigeration coil. The conveying strand is made up of a series of individual plates attached outwardly of the chain connecting the plates and is free to flex in only one direction. Within the vault the conveyor travels about two parallel elongated spiral networks, each including two vertical shafts supporting a stacked array of rotating sprockets. A crossover strand connects the two networks at the base of two adjacent shafts and a second crossover strand connects at the top of the opposite pair of shafts. The top crossover strand is brought outside the vault and there travels about a driving sprocket and an idler forming an outside loop enclosing a work table for performing operations on the products. The outside loop traces out an asymmetrical geometrical figure having two parallel sides, with the driver located at the acute angle formed therein. The driving sprocket can be sized independently of the outer sprockets over which the conveying strand travels within the vault. The vault itself is divided into two chambers, one a vestibule through which the products travel as they enter or exit the vault, and serving to isolate the second chamber from the outside air. The second chamber contains the conveyor networks, the blower and refrigeration coil. The cooling is accomplished by circulating the air within the compartment in a direction transverse to the paths over which the conveyor travels. Detection systems are employed to insure complete distribution and effective cooling of the products. The blowers and refrigeration coil are located above the conveyor networks along substantially the entire length of the conveyor networks.

32 Claims, 8 Drawing Figures

FOOD PRODUCT FREEZING APPARATUS

Matter enclosed in heavy brackets [ ] appears in the original patent but forms no part of this reissue specification; matter printed in italics indicates the additions made by reissue.

FIELD OF THE INVENTION

This invention relates in general to machines for freezing food products and more particularly to such a machine employing a continuously operating conveyor system and a convection cooled freezing vault.

DESCRIPTION OF THE PRIOR ART

Food product freezing machines employing freezing vaults and continuously operating conveyor systems are known in the art. In such systems the conveyor configuration and the heat transfer characteristics within the vault involve interlinked design considerations, since the length of the conveyor system within the vault is determined by the amount of time, at a given speed, which is required to freeze the food product, while the cooling efficiency within the vault depends on both the air flow and refrigeration design and the arrangement and the conveyor elements within the vault. In these systems, the food product is deposited on a product carrying plate on the conveyor outside the vault and is then carried by the conveyor into the vault where it is frozen and thence out of the vault to be picked up by the other food processing machinery. From a cooling efficiency and floor space standpoint, the freezing vault should be as small as possible, yet a considerable length of conveyor within the vault is required to retain the product for a sufficient period to freeze it. Accordingly the conveyor strands within the vault follow a circuitous path in order to obtain the necessary time at the selected conveyor speed. Various forms of conveyor path configurations, or stranding, have been employed in the prior art devices. The conveyor itself is usually formed of a roller chain carrying a series of individual product support plates, fixed to one side of the chain. Since a series of these closely spaced plates allows the conveyor to flex in only one direction, the circuitous path is free to turn in only one direction, thereby imposing a relatively severe limitation on the choice of path configurations. Most of the forms of stranding have employed two parallel spiral networks, each consisting of two vertically arranged rotatable shafts, with a vertical series of idler sprockets mounted on each shaft, and a conveying strand between the two shafts, the path always turning in the same direction about each shaft. In one network the strand follows a downward spiral path and in the other an upward spiral path. The most convenient means for connecting the two networks together is by passing a crossover strand from the bottom sprocket of one shaft of the downward spiral to the bottom sprocket of a shaft of the opposite upward spiral, and passing the second crossover strand from the top sprocket of a shaft in the first network to the top sprocket of a shaft in the opposite network.

Two configurations of stranding are employed by prior art systems to bring a loop of the conveyor outside the vault. In one arrangement the top connecting strand passes from one network, beyond the other network, and then through one wall of the vault, where it passes over a driving sprocket and then runs in a direction parallel to the networks within the vault for the length of the vault until it reaches a sprocket still outside the vault. The loop turns at this additional sprocket and then re-enters the vault through the wall to join the other spiral network. In another arrangement one of the loops of a spiral network is brought out at the short end wall of the vault nearest the shaft it would otherwise have turned around to an externally mounted drive sprocket where it turns then re-enters through the same wall of the vault and continues along the same network. In the first configuration, the chain is only in contact with the driver along a 90° arc. In the latter configuration the chain is in contact with the driver along a 180° arc, however the distance between the two sides of the outside loop is limited to the pitch diameters of the idler sprockets within the vault, since the chain can only turn in one direction. In this configuration then, either the work area is very narrow or the sprockets are quite large, the latter condition incurring wasted space within the vault.

In the prior art machines the heat transfer designs have utilized both conduction cooling and convection cooling. In one prior art conduction system, the plates are in direct contact with a refrigerator coil. In the convection system, the products are exposed to circulated air which has been chilled by passing it over a refrigeration coil. For a given vault base area and conveyor run-length within the vault, a rectangular base area with each spiral network aligned with the longer dimension of the vault is preferred, since fewer passes from shaft-to-shaft need be made. In one prior art convention cooling system, the blower is located directly above the conveyor and adjacent the wall containing the pass through windows for the conveyor. The flow of high velocity air from the blower impinges directly on the conveyor where the conveyor enters the vault, and then passes along the base of the vault, upwardly through the conveying system, and over a refrigeration coil located above the conveying system. This system does not employ any turning vanes to prevent stratification and stagnation of the air within the vault, and accordingly some portions of the vault receive virtually no air circulation at all. Furthermore, circulating the air directly at the food products as they enter the vault produces turbulence in this area which results in the loss of cold air through the conveyor pass through windows and the infiltration of warm moist air from outside the chamber, thus further reducing the efficiency of heat transfer of the system, particularly since the warm moist air frosts the inside of the chamber. This frost build-up necessitates frequent defrosting production halts and further reduces efficiency, since it clogs the refrigeration coil. The blower in this prior art device directs the air flow along a path parallel to the spiral networks. Since it follows the narrower dimension of the vault, it must travel at a higher velocity, in order to achieve the same volumetric flow rate, as it would if it could follow a broader stream tube area. Thus when this system operates at the maximum allowable flow velocity to avoid disturbing the products on the plates, the coil must be maintained at a lower temperature level in order to obtain the same cooling rate that could be achieved at this same flow velocity with larger volumetric flow rate.

SUMMARY OF THE INVENTION

In the present invention the freezing vault is rectangular and includes an internal conveyor configuration of two parallel elongated spiral networks, each network including two upright shafts carrying a stacked array of rotating sprockets. The conveyor roller chain with its attached product carrying plates passes around these sprockets. The top crossover strand passes in and out of the vault through openings spaced apart in the short, end wall, a distance equal to the separation between the two outer strands of the two spiral networks. Outside the vault this strand passes over a driving sprocket and an idler and traces out an asymmetrical geometrical figure having two parallel sides with the driving sprocket located at the corner of the figure containing the acute angle. In this configuration the chain is in contact with the driver along an arc greater than 90°. Furthermore the driving sprocket in this configuration can be substantially larger than the rotating idler sprockets over which the conveyor travels within the vault. With this arrangement the work table formed by the enclosed area of the loop can be sufficiently wide so that the product depositing and pick-off devices can be located within the area formed by the outside loop. This configuration permits a designer a choice in shape and allows him to select the optimum length for the outside loop, since the other geometry restraints that existed in the prior art deivces no longer apply.

The freezing vault is divided into first and second chambers by a bulkhead located directly opposite and a short distance from the pass through wall of the vault. This bulkhead contains openings allowing the conveyor to pass through, as it enters and exits the vault. The first chamber serves to buffer and isolate the second chamber from the outside air, while the two spiral networks of the conveying system are located within the second chamber. A series of fans and a refrigeration coil are located directly above the spiral networks and extend the entire length of the networks. The fans move the air in a direction perpendicular to the long axis of the spiral networks onto the refrigeration coil positioned opposite the fans and extending along the opposite wall of the vault. The air then flows down that longitudinal wall and is deflected back at all levels through the conveyor networks to the side of the vault where the fans are located. This refrigerating configuration is superior to the air circulation method used in prior art devices, since it permits a larger volumetric flow rate for the same air velocities. This in turn, permits the coil to operate at a higher temperature and greatly increases the efficiency of the freezing cycle. Moreover the circulation pattern, crosswise of the chamber, does not blow air directly past the pass through windows to the outside, and thus the amount of air brought into the vault through these windows is reduced.

The larger available refrigeration coil face area has a greater tolerance to frost build-up and blockage and permits the use of a coil that is thinner in the direction of flow, thereby reducing the resistance to the air as it flows through the coil.

In order to prevent flow stratification and air stagnation, turning vanes are placed at three 90° turn in the flow path. These vanes are located in access aisles which extend between the vault walls and the outer sides of the spiral networks. These vanes are hinged to provide ready access to the conveying system. Another set of deflection vanes are attached to the conveyor support rails to cause a portion of the circulating cold air to flow up against the base of the product carrying plates, thereby increasing the rate at which heat is transferred through these plates and from the products they carry.

The first chamber or vestibule not only reduces the exchange of air with the outside atmosphere, but also acts as a dehumidifier by exposing any warm moist air that enters it to the cold air trapped therein, thereby precipitating the moisture as frost before it enters the second chamber.

As mentioned above, each spiral network comprises two vertical shafts supporting a stacked array of rotatable sprockets with the conveying strand passing alternately from one shaft to the other until it reaches a point diagonally opposite the point at which it first entered the network, whereupon it passes on to the other network. Each shaft is supported by a supporting frame. In this device the top sprocket on the far end of the ingoing network is not directly connected to the shaft, to which the other sprockets forming this end of the network are attached. It is attached, instead, to a beam which forms the top side of a parallelogram linkage. This beam is free to move in a direction parallel to the base of the vault within the plane of linkage, which is parallel to the plane of the ingoing spiral network. Thus upper member is subject to a continuous force which tends to push it away from the opposite shaft of this network. This linkage keeps the conveying strands in tension and compensates for any relative dimensional changes developing between the conveyor and the support frame during normal operation, or as a result of temperature changes occurring when the system is shut down or started up. This arrangement greatly reduces the possibility that the chain will become disengaged from the sprockets over which it travels. In the described machine an improved efficiency of the driving mechanism is achieved due to the increased wrap around the driving sprocket, and the fact that the driving sprocket can be sized independently of the idler sprockets within the freezing vault. The external loop forms an enclosed area of suitable size and shape for mounting devices to perform operations on the product outside freezing vault. The cooling system of this invention operates at a much greater efficiency and is less susceptible to frost build up and blockage, while permitting the maximum use to be made of freezing vault volume.

BRIEF DESCRIPTION OF THE DRAWINGS

For a fuller understanding of the nature and objects of the invention, reference should be had to the following detailed description taken in connection with the drawings in which.

DESCRIPTION OF PREFERRED EMBODIMENTS

Figure 1:
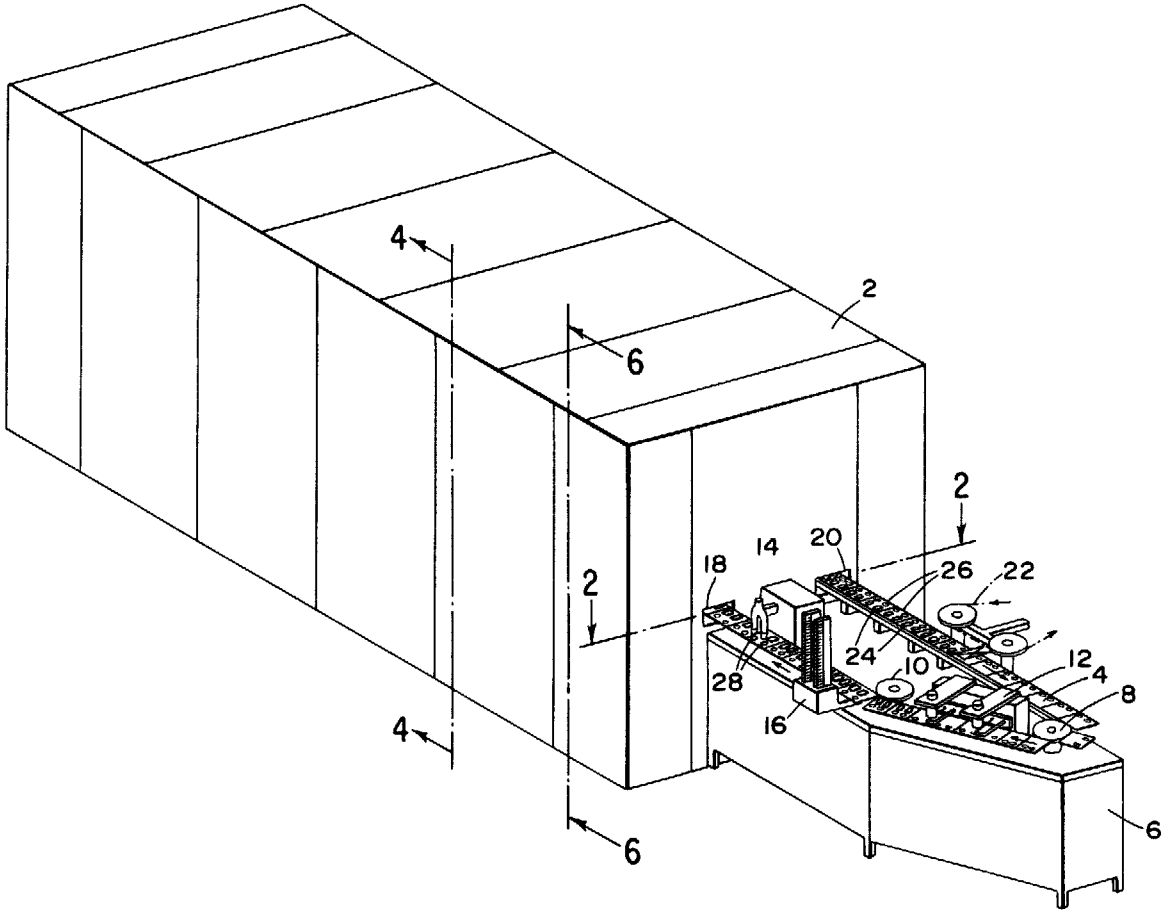
FIG. 1 shows a perspective view of a freezing apparatus in accordance with this invention.

Referring to FIG. 1, the external configuration of my food product freezing apparatus is shown. The endless conveyor 4 carries food products 24 on a series of plates 26 through freezing vault 2. Worktable 6 supports conveyor 4, driving sprocket 8 and idler 10. Driving sprocket 8 is mounted on a shaft connected to a driving motor (not shown) within worktable 6. Ice cream extruders 12 and 14 are located within the enclosed area formed by the outside loop of conveyor 4 and vault 2, and are also attached to worktable 6. After the conveyor 4 passes around driving sprocket 8, it collects soft food products at either station 12 or 14. Stick inserter 16 may be used to insert holding sticks into the products as they pass by that station. After the products are deposited on the plates 26 of conveyor 4, they are carried into the freezing vault through pass through window 18. After the products are frozen solid within freezing vault 2, they exit through pass through window 20 and are then removed from the conveyor by a pick-off apparatus 22.

The conveying plates 26 are individually and separately mounted in series on a conveying chain 86 (FIG. 7) and can support either food products 24 or ice cream cone novelties which can be inserted into support holes 28.

Figure 2:
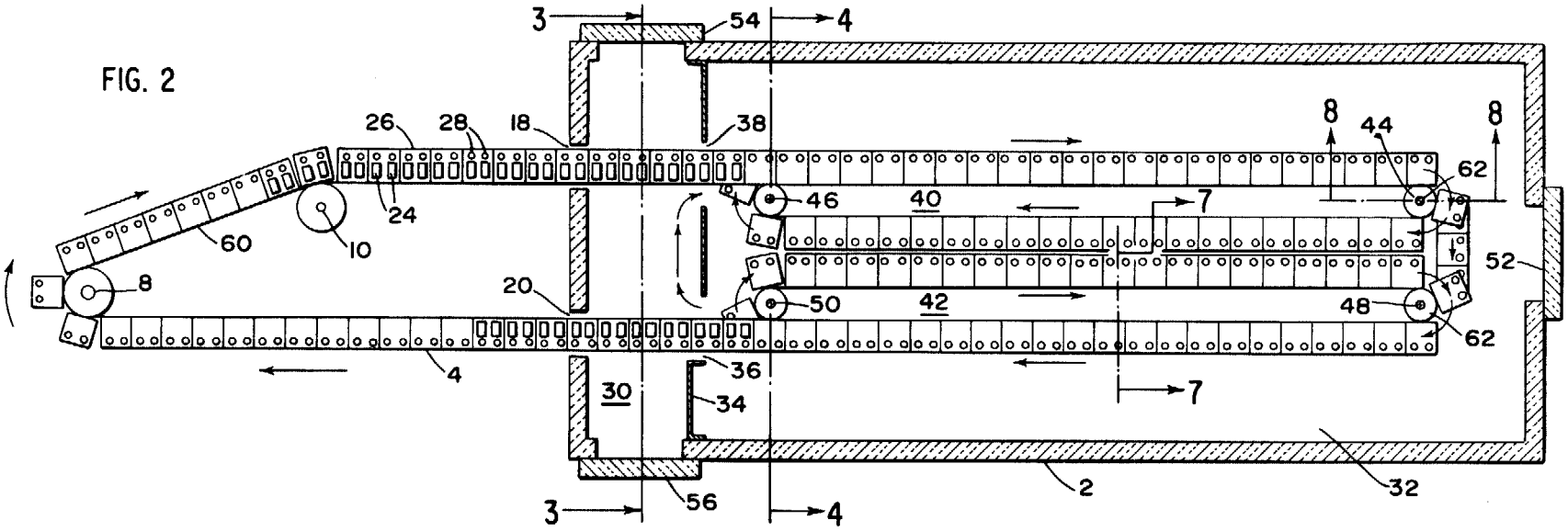
FIG. 2 is a sectional plan view of a freezing system in accordance with this invention.

As illustrated in FIG. 2, the freezing vault 2 is divided into a vestibule chamber 30 and a second chamber 32 by bulkhead 34. The outside loop 60 of conveyor 4 moves through the bulkhead pass through windows 36 and 38. Within the second chamber 32, the conveyor 4 passes about two spiral networks 40 and 42. Network 40 is the ingoing network and network 42 is the outgoing network. The walls of freezing vault 2 are insulated to reduce heat transfer from the atmosphere into the vault. Access to the interior of vault 2 may be had through access doors 52, 54, and 56.

Figure 3:
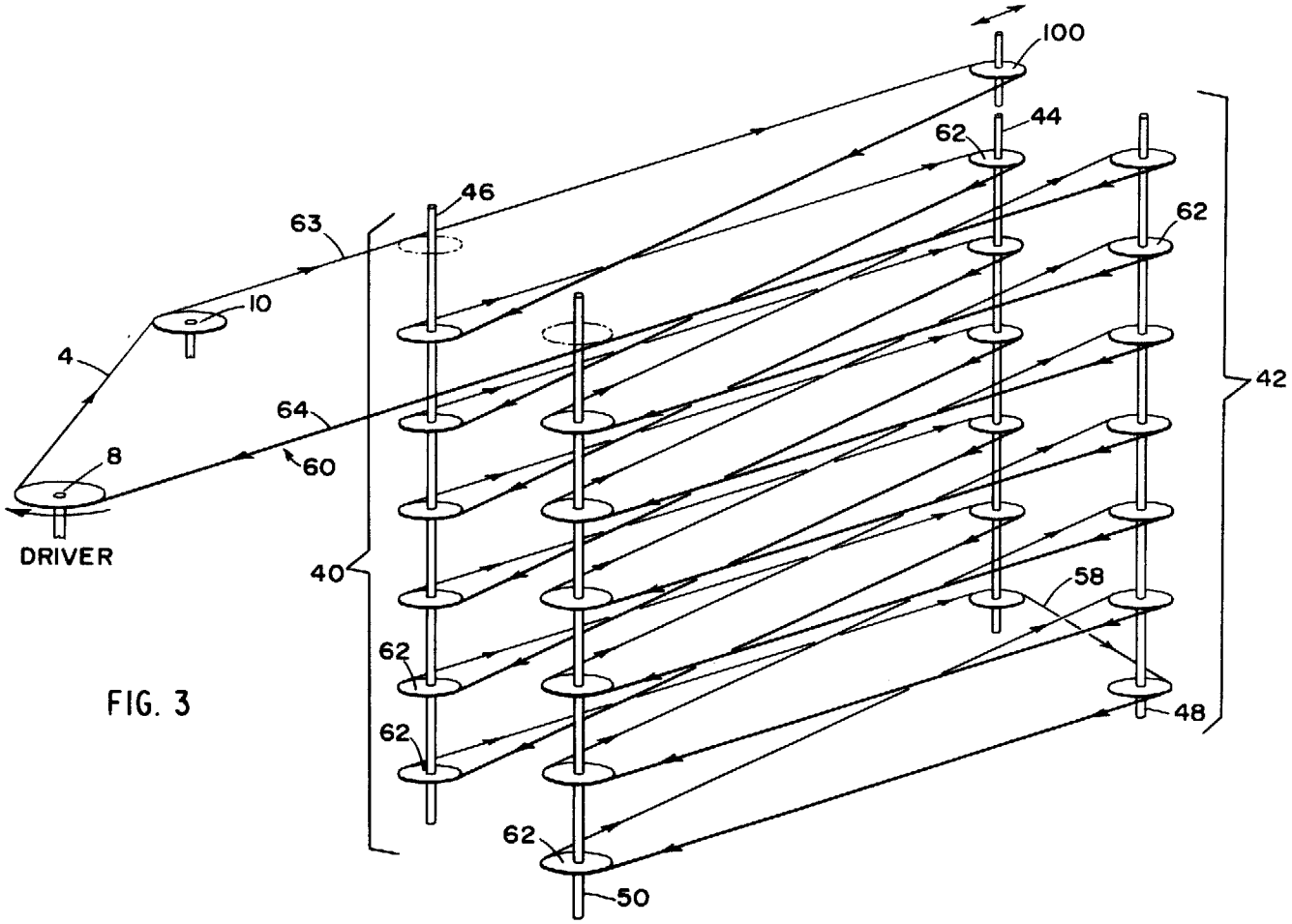
FIG. 3 is a diagrammatic illustration of a stranding configuration in accordance with this invention.

As noted above, the individual plates 26 are each individually and separately mounted in series on the side of conveying roller chain 86. This arrangement obviously will only permit the conveyor 4 to flex in one direction. In the system shown, where the plates 26 are mounted on the left side of the chain 86 the conveyor 4 is only capable of flexing to the right. This limitation imposes severe restrictions on the forms of stranding which may be employed. The form of stranding employed in this device is best illustrated in FIG. 3. The stranding system is composed of two parallel spiral networks 40 and 42. Each shaft 44, 46, 48 and 50 supports a vertically stacked array of sprockets 62, around which the conveyor 4 travels. Ingoing network 40 receives the conveying strand 4 from idler 10 and passes it, around the sprockets 62 on shafts 44 and 46, in a downward traveling spiral until it reaches the lowest sprocket on shaft 44. It then passes as connecting strand 58 to the bottom sprocket on shaft 48 where it enters the upwardly spiraling and outgoing network 42, passing alternately around the sprocket 62 on shafts 48 and 50 until it reaches the upper most sprocket in network 42 where it becomes the top connecting strand 60. This top connecting strand 60 forms the outside loop which passes through the walls of the first chamber 30, as shown in FIG. 2.

Outside the vault 2, loop 60 passes around driver 8 and idler 10. Loop 60 encloses a plane forming an asymmetrical geometrical figure having two parallel sides. The driving sprocket 8 is mounted further away from the freezing vault 2 than idler 10, and is therefore located in the acute angle formed by the conveying strand 4 as it passes from vault 2 around the driver 8 and over to idler 10. Thus the conveyor chain 4 is in contact with driving sprocket 8 along an arc that encompasses an angle substantially greater than 90°. Obviously it is desirable to have a large wrap around the driving sprocket 8, so that it can drive conveyor 4 with less tendency to jump teeth, by taking advantage of more teeth in contact. In this configuration, driving sprocket 8 can be sized independently of the idler sprockets 62 since, loop 60 does not return from it directly to network 42. Hence driving sprocket 8 can be sized according to good driving sprocket practice. The distance between the two parallel sides 63 and 64 of loop 60 is equal to the distance between the outside strands of the two networks 40 and 42, which is greater than twice the width of either network. Thus the enclosed area formed by outside loop 60 provides sufficient area of a suitable shape to mount the devices which deposit, operate on, or pick-off the food products as the conveyor 4 passes outside the freezing vault 2. Additionally this loop can be sized to keep to a minimum, its exposure time to the warmer outside air. Most importantly this form of stranding still meets the right-hand turn limitation imposed by the conveyor design.

Figure 5:
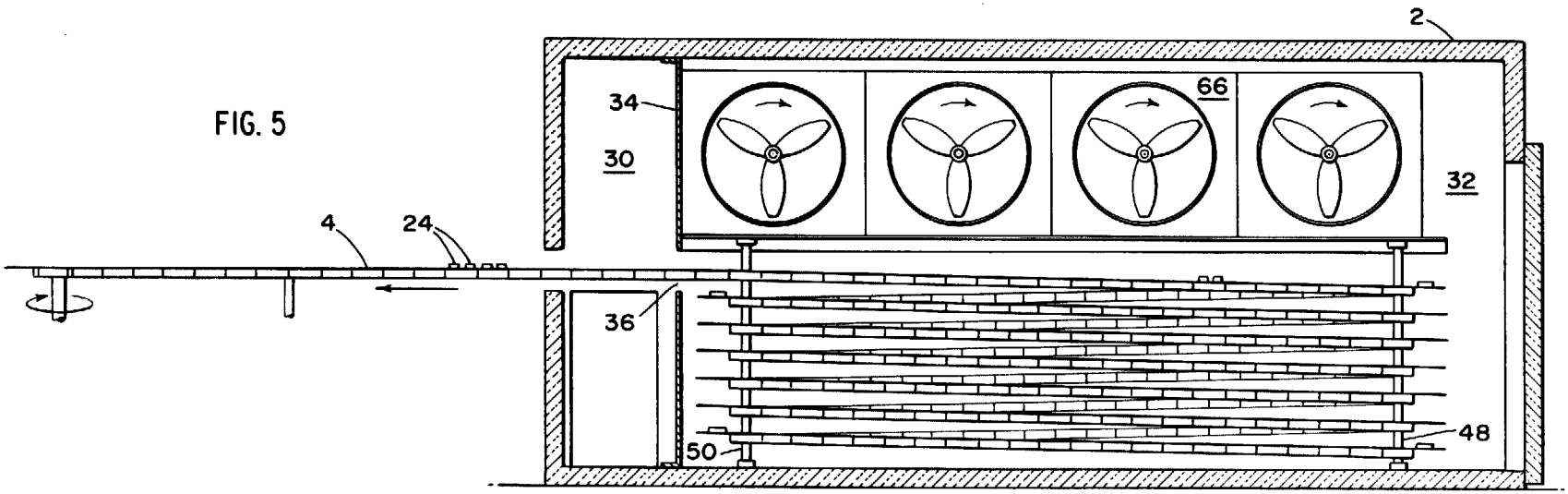
FIG. 5 shows a sectional right side view of a freezing system in accordance with this invention.
Figure 4:
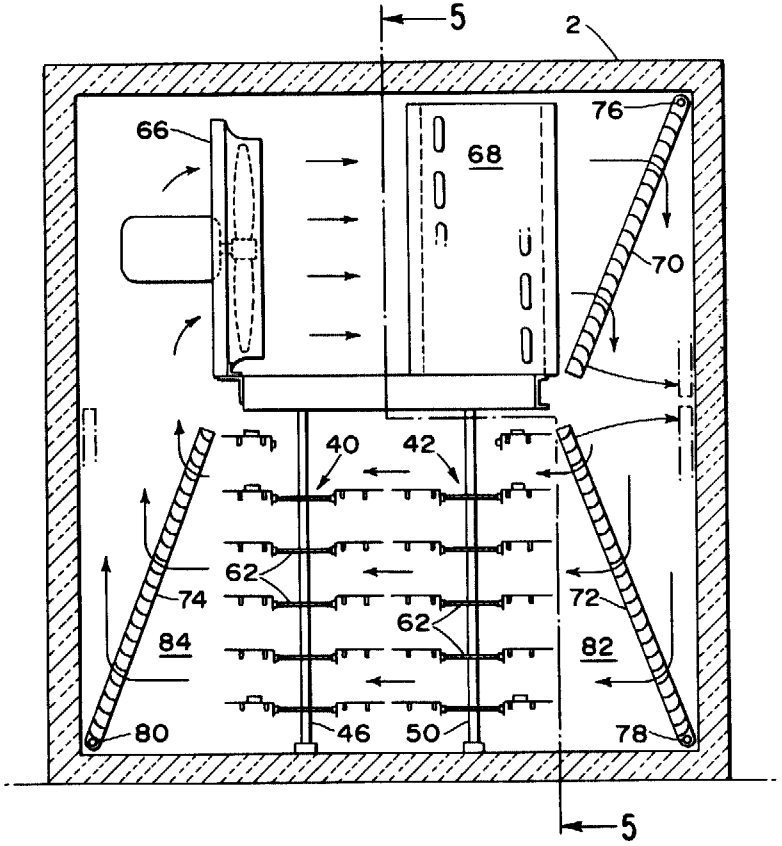
FIG. 4 is a sectional front view of the freezing vault in accordance with this invention.

As shown in FIG. 2, within the vault 2 the second chamber 32 has a rectangular plan area. The directions of travel of conveyor 4 in networks 40 and 42 is aligned with the longer dimension of chamber 32. As shown in FIGS. 4 and 5 the flow of air within this chamber 32 is provided by a set of fans 66 housed above spiral networks 40 and 42 and positioned directly opposite a refigeration coil 68. These fans 66 extend substantially the entire length of networks 40 and 42. Refrigeration coil 68 also extends the entire length of the networks 40 and 42. The exit area of fans 66 and the frontal area of coil 68 are substantially equivalent. The flow of air from the fan 66 is directed into coil 68 where it is chilled and after passing through this coil is deflected by a first set of turning vanes 70, then proceeds downwardly through the chamber until it meets a second set of turning vanes 72 where it is deflected horizontally flowing across networks 42 and 40 of conveyor 4. After this frigid air passes completely through the conveying system within chamber 32, it is deflected upwardly by a third set of turning vanes 74 into the intake of fans 66.

Below a maximum coil temperature more efficient freezing is achieved by increasing the circulation rate of the air through the chamber than can be achieved by further reducing the coil temperature and maintaining the same rate of circulation. However, increasing the air flow velocity above 750–1000 feet per minute does not substantially increase cooling efficiency, thus placing an upper limit on desirable air velocity within the chamber. As shown in FIG. 5, the fans 66 occupy substantially the entire area between the uppermost portion of the conveying network and the roof of chamber 32. Such an arrangement will, at any given air flow velocity, produce the maximum volumetric flow rate available for this chamber. Given the same freezing chamber size and air velocity, this arrangement will produce a volumetric flow proportionately greater than that produced by prior art devices in which the fans were oriented 90° in the other direction which produces a cross sectional area of flow reduced by the ratio of the width to the length of the chamber for the same height chamber. At the maximum flow velocity of 750–1000 feet per minute, the refrigeration coil 68 can be maintained at its most efficient temperature setting. In this arrangement there is a complete circulation of the frigid air through the freezing chamber without losses due to stagnation or stratification of the air as it circulates.

Figure 7:
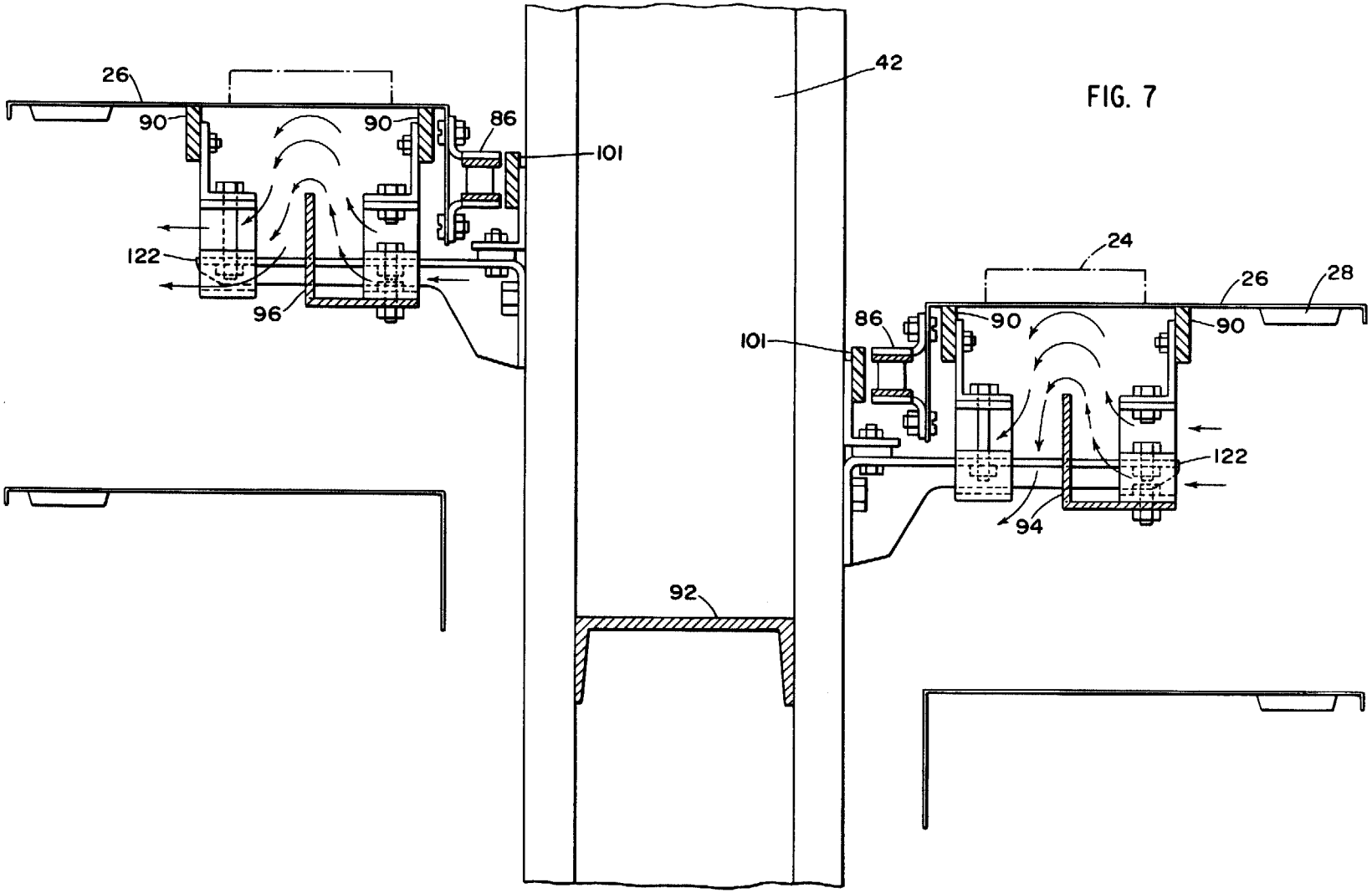
FIG. 7 is an enlarged sectional view of a portion of the conveying support frame in accordance with this invention.

The details of construction of the conveyor are illustrated in FIG. 7, where two opposite levels of the conveying network 42 are shown. In general the network is formed of a fixed steel frame 92 carrying a series of support rails 90, forming an elongated spiral track with the product plates 26 carried on a flexible roller chain 86 over these rails. As there indicated, the stainless steel support plates 26 are fixed to the roller chain 86. Phenolic wear strips are employed as the supporting rails 90 to maintain the plates 26 in the horizontal plane. This same material as is used as a rail 100 to guide the chain in the vertical plane operating in conjunction with the face of rail 90. Supporting rails 90, and deflectors 94 and 96 are attached to frame 92 by brackets 122. The deflector plates 94 are located upstream of support frame 92, with respect to the air flow and deflector plates 96 are located downstream of the frame. As shown by the flow direction arrows, the deflector plates 94 and 96 tend to scoop the air and cause the air stream, as it passes across the conveyor, to impinge against the base of the support plates 26. They may also trip the flow, if it is not already turbulent. These deflector plates substantially increase the heat transfer from the base of plate 26 and thereby substantially reduce the time it takes to freeze product 24. This arrangement further increases the efficiency of the entire freezing system.

As noted above the coil 68 extends substantially the entire length of networks 40 and 42 and has a frontal area approximately equal to the exit area of the series of fans 66. Thus coil 68 can be thinner than prior art coils, thereby presenting a smaller cross sectional area to the flow with proportionately less flow impedance. Coil 68 also has a proportionately greater tolerance to frost build-up and blockage, which would otherwise rapidly degrade the efficiency of the system.

Figure 6:
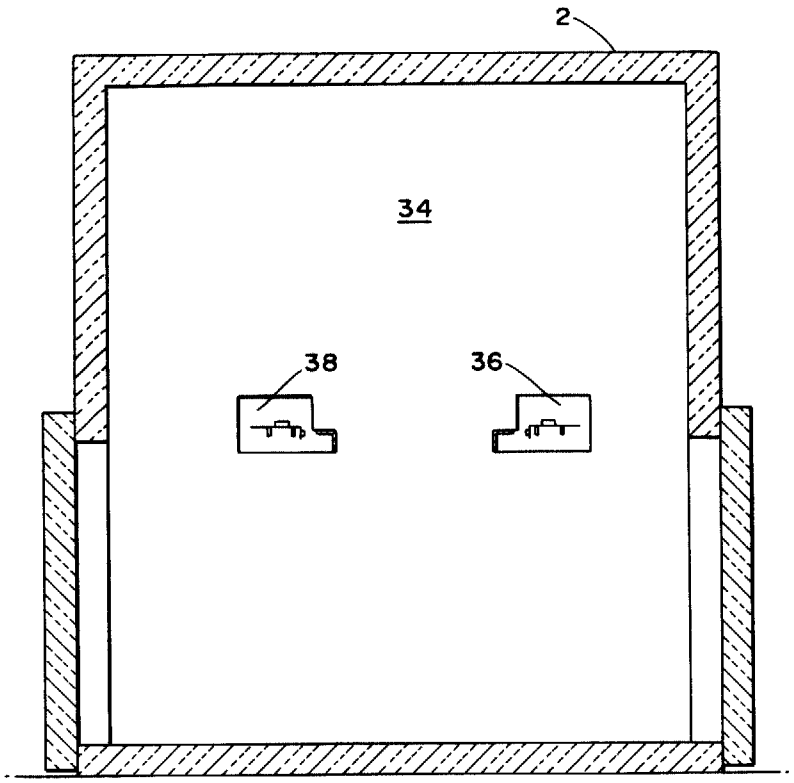
FIG. 6 is another front sectional view of the freezing vault in accordance with this invention.

As shown in FIG. 6, the bulkhead 34 extends from wall to wall and from the floor to the ceiling of vault 2. The only openings between the first chamber or vestibule 30 and the second chamber or air box 32 is through the pass through windows 36 and 38 inserted for conveyor 4. The flow pattern produced by the air circulation system 66 and 68 is generally parallel to the plane of bulkhead 34, thus keeping to a minimum the air exchange between the chambers. Furthermore, as shown by the flow directional arrows through windows 36 and 38 in FIG. 2, cold air leaking from the second chamber or air box 32 through window 36 tends to return through window 38. The introduction of the bulkhead 34 between the freezing system and the outside wall of the vault 2, through which the conveyor 4 passes, tends to further isolate the freezing system from the outside air and decreases the amount of air exchange with the atmosphere. Heat transfer through uninsulated bulkhead 34, and the cold air that does leak into the vestibule 30 tends to keep that chamber at a very low temperature. Accordingly, the outside air that leaks through pass through windows 14 and 20 into the vestibule 30 is quickly dehumidified, since the temperature of chamber 30 is low enough to cause precipitation of the moisture contained in the air. This arrangement increases the operating time between defrosts of the freezing system, since it retards frost build-up within chamber 32. Obviously, the less often the system is shut down, the greater its productivity.

In every freezing system of this type, it is necessary to provide access to the machine in the event of breakdown or for routine inspection. Access aisles 82 and 84, shown in FIG. 4, are provided for that purpose. The turning vanes 70, 72 and 74 are inserted in these aisles and occupy what would otherwise be wasted space within the vault. These vanes are hinged respectively at 76, 78 and 80 and can be swung out of the way when access is desired to the machinery contained within the second chamber or air box 32.

Figure 8:
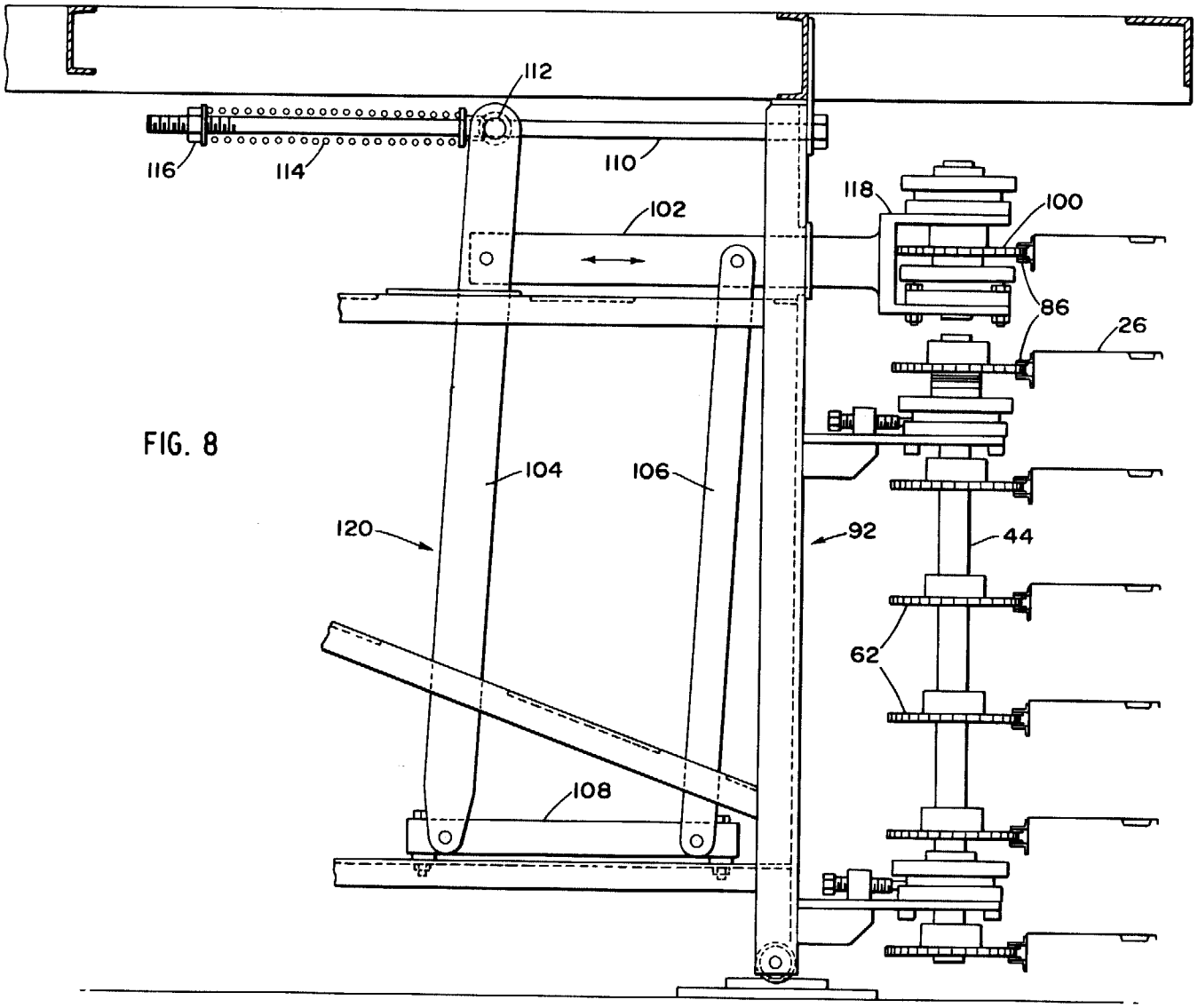
FIG. 8 is an enlarged right side view of the strand tensioning mechanism in accordance with this invention.

As shown in FIG. 3, the uppermost sprocket, 100 in network 40 is not directly attached to shaft 44. Referring to FIG. 8, sprocket 100 is shown supported by a bearing support mount 118 which is attached to beam 102. Beam 102 is pivotally fastened to arms 104 and 106, at points equidistant from beam 108 to which they are pivotally attached. Beam 108 is fixedly attached to support frame 92. The parallelogram linkage 120 formed by these members permits beam 102 to move to the left or right in a direction substantially parallel to beam 108. This linkage is biased to push beam 102 and sprocket 100 outwardly in order to maintain the roller chain 86 under tension. The biasing mechanism includes shaft 110, guide 112 and spring 114. Shaft 110 is attached to support frame 92 and carries a guide 112, which is free to travel along shaft 110. Spring 114 surrounds shaft 110 and is located between guide 112 and adjustment nut 116. Arm 104 is pivotally attached to guide 112. The nut 116 is adjusted until spring 114 is compressed and applies a force against arm 104, which in turn pushes beam 102 and sprocket 100 to the right. Chain 86 opposes this motion and is thus kept under constant tension. The parallelogram linkage 120, thereby compensates for relative dimensional changes between the support frame and the chain 86, which may be caused by differences in thermal expansion of dissimilar materials or elongation of the chain under load. The parallelogram linkage 120 lies entirely within the conveyor strands 4 as they pass around network 40. The plane of this parallelogram linkage 120 is parallel to the plane containing shafts 44 and 46 of network 40.

Since certain changes may be made in the above constructions without departing from the scope of the invention, it is intended that all matter contained in the above description and shown in the accompanying drawings shall be interpreted as illustrative and not interpreted in the limiting sense.

It is also to be understood that the following claims are intended to cover all of the generic and specific features of the invention herein described, and all statements of the scope of the invention which, as the matter of language, might be said to fall therebetween.

Having described my invention, what I claim as new and desired to secure by Letters Patent is:

1. A food freezing apparatus comprising:

a vault;

a continuous conveying means for transporting food products into, through and out of said vault, said conveying means traveling primarily in at least one network along *vertical* substantially parallel planes within said vault;

a refrigeration coil;

means for circulating air in heat exchange with said coil and over said products in a direction substantially parallel to a plane perpendicular to the primary planes of travel of said conveying means within said vault; and a bulkhead within said vault forming a first and second chamber within said vault, said food products passing into and out of said vault through said first chamber, said second chamber containing said means for circulating air, said coil and said networks, wherein said bulkhead is positioned substantially perpendicular to the primary planes of travel of said conveying means and parallel to said air circulation direction.

2. Apparatus in accordance with claim 1 wherein said bulkhead is formed such that the temperature of said second chamber is substantially lower than the ambient temperature outside said vault.

3. Apparatus in accordance with claim 2 wherein said vault is formed with thermally insulating outside walls and said bulkhead is formed of a non-thermally insulating material.

4. A food freezing apparatus comprising:

a vault;

a continuous conveying means for transporting food products into, through and out of said vault, said conveying means traveling primarily in at least one network along *vertical* substantially parallel planes within said vault;

a refrigeration coil;

means for circulating air in heat exchange with said coil and over said products in a direction substantially parallel to a plane perpendicular to the primary planes of travel of said conveying means within said vault; and a bulkhead within said vault forming a first and second chamber within said vault, said food products passing into and out of said vault through said first chamber, said second chamber containing said means for circulating air, said coil and said networks, wherein said bulkhead is positioned substantially perpendicular to the primary planes of travel of said conveying means and parallel to said air circulation direction, and further comprising, access aisles within said second chamber, external of said conveying means within said second chamber and running substantially parallel to said conveying means; said means for circulating air and said coil extending substantially the length of said networks and located above said networks; said circulating means nearer one corner of said second chamber; and hinged turning vanes extending substantially the length of said networks located within the other three corners and extending into the aisles of said chamber.

5. The apparatus as described in claim 4 which further comprises deflecting plates for increasing the heat transfer from the base of said conveying means, said plates directing the flow of air in said second chamber against the base of said conveying means.

6. A food product freezing apparatus comprising:

a generally rectangular freezing vault, cooling means within said vault;

continuous conveying means including a series of product carrying plates for transporting said food products into, through and out of said vault, said conveying means following a circuitous path within said vault, said path including a first elongated spiral network and a second elongated spiral network, the long axis of said spirals being aligned along the length of said rectangle, each network comprising two stacked arrays of rotatable members, said arrays being placed parallel to each other and connected by conveying strands passing alternately from one to the other, said networks being connected at the bottom rotatable members of two adjacent arrays by a bottom cross over strand and at the top rotatable members of the opposite two arrays by a top cross over strand, one of said cross over strands passing out of and into said vault through one of the short sides of said vault and forming an outside loop passing around an external rotatable member and encompassing an enclosed area suitable for placing machinery associated with said freezing apparatus.

7. The apparatus as described in claim 6 wherein said loop passes around a rotatable driving member substantially larger in diameter than the other rotatable members within said vault.

8. The apparatus as described in claim 6 wherein said outside loop passes around two external rotatable members and forms an asymmetrical geometrical figure having two parallel sides.

9. The apparatus as described in claim 6 wherein the external rotatable member, located at the furthest point from said vault, drives said conveying means.

10. The apparatus as described in claim 9 wherein said loop is in contact with said external rotatable member along an arc encompassing more than a 90° angle.

11. Apparatus as described in claim 9 wherein said loop passes around a rotatable driving member substantially larger in diameter than the other rotatable members within said vault.

12. A food product freezing apparatus comprising:

a generally rectangular freezing vault, convective cooling means and access aisles within said vault;

continuous conveying means capable of flexing in only one direction for transporting said food products into, through and out of said vault, said conveying means traveling primarily along parallel planes within said vault while following a first elongated spiral network and a second elongated spiral network, the long axis of said spirals being aligned with the length of said rectangle, each network comprising two stacked arrays of rotatable members, said arrays being placed parallel to each other and connected by strands passing alternately from one to the other, said networks being connected at the bottom rotatable members of two adjacent arrays by a bottom crossover strand and at the top rotatable members of the opposite two arrays by a top cross over strand, one of said crossover strands passing out of and into said chamber through one of the short sides of said vault and forming an outside loop encompassing an enclosed area external of said vault suitable for placing machinery associated with said freezing apparatus; and said cooling means positioned to direct the flow of air within said vault along paths substantially parallel to a plane perpendicular to the primary planes of travel of said conveying means within said vault.

13. The apparatus as described in claim 12 wherein said cooling means comprises an air circulation means and a refrigeration coil.

14. The apparatus as described in claim 13 wherein both said circulation means and said refrigeration coil extend substantially the length of said networks.

15. The apparatus as described in claim 14 which further comprises:

a set of turning vanes located within an access aisle within said vault, for turning the air stream from said refrigeration coil to direct it across said conveying means.

16. The apparatus as described in claim 15 which further comprises:

supporting structure for said conveying means;

deflecting means attached to said supporting structure and located below said conveying means for directing the airflow toward said conveying means.

17. The apparatus as described in claim 12 wherein: said outside loop passes around first and second external rotatable members; the first rotatable member, located at a point farther from said vault than the second external rotatable member, drives said conveying means; said first external rotatable member being substantially larger in diameter than the rotatable members in the arrays within said vault; and said loop is in contact with said rotatable driving member along an arc encompassing more than a ninety degree angle.

18. The apparatus as described in claim 17 wherein said cooling means comprises an air circulation means and a refrigeration coil.

19. The apparatus as described in claim 18 wherein both said circulation means and said refrigeration coil extend substantially the length of said networks.

20. The appartus as described in claim 19 which further comprises:

a set of turning vanes located within an access aisle within said vault for turning the air stream from said refrigeration coil to direct it across said conveying means.

21. The apparatus as described in claim 20 which further comprises:

supporting structure for said conveying means;

deflecting means attached to said supporting structure and located below said conveying means for directing the airflow toward said conveying means.

22. The improvement as described in claim 12 which further comprises:

a bulkhead within said vault forming a first and second chamber within said vault;

said one connecting strand passing in both directions through said bulkhead and said first chamber by means of pass through windows located therein; and wherein said second chamber contains said cooling means.

23. The appartus as described in claim 22 wherein said cooling means comprises an air circulation means and a refrigeration coil.

24. The apparatus as described in claim 23 wherein both said circulation means and said refrigeration coil extend substantially the length of said networks.

25. The apparatus as described in claim 24 which further comprises:

a set of turning vanes located within an access aisle within said second chamber for turning the air stream from said refrigeration coil to direct it across said conveying means.

26. The apparatus as described in claim 25 which further comprises:

supporting structure for said conveying means;

deflecting means attached to said supporting structure and located below said conveying means for directing the airflow toward said conveying means.

27. The apparatus as described in claim 22 wherein: said outside loop passes around first and second external rotatable members; the first rotatable member, located at a point farther from said vault than the second external rotatable member, drives said conveying means; said first external rotatable member being substantially larger in diameter than the rotatable members in the arrays within said vault; and said loop is in contact with said rotatable driving member along an arc encompassing more than a ninety degree angle.

28. The apparatus as described in claim 27 wherein said cooling means comprises an air circulation means and a refrigeration coil placed downstream of said circulation means and upstream of said conveying means.

29. The apparatus as described in claim 28 wherein both said circultion means and said refrigeration coil extend substantially the length of said networks.

30. The apparatus as described in claim 29 which further comprises:

a set of turning vanes located within an access aisle within said second chamber for turning the air stream from said refrigeration coil to direct it across said conveying means.

31. The apparatus as described in claim 30 wherein said circulating means are located in one corner of said second chamber and said turning vanes are located in and extend from the other three corners of said second chamber, each of said vanes extending substantially the length of said networks.

32. The apparatus as described in claim 31 wherein said conveying means is maintained in tension by tensioning means comprising a parallelogram linkage exerting a continuous force against the top sprocket in the network first receiving said top connecting strand and furthest from said driving means.

* * * * *

UNITED STATES PATENT AND TRADEMARK OFFICE

CERTIFICATE OF CORRECTION

PATENT NO. : RE 29,477

DATED : November 22, 1977

INVENTOR(S) : Edward M. Wight

It is certified that error appears in the above-identified patent and that said Letters Patent are hereby corrected as shown below:

In "References Cited", "2,489,918 11/1947 Melees....62/65", should be --2,489,918 11/1949 Menges....62/65--.

In "Abstract", line 20, "outer" should be --other--.

Signed and Sealed this

*Twenty-seventh* Day of *June 1978*

[SEAL]

*Attest:*

RUTH C. MASON
*Attesting Officer*

DONALD W. BANNER
*Commissioner of Patents and Trademarks*